US012101730B2

(12) United States Patent
Jayaramachar et al.

(10) Patent No.: US 12,101,730 B2
(45) Date of Patent: Sep. 24, 2024

(54) METHODS, SYSTEMS, AND COMPUTER READABLE MEDIA FOR DISCOVERING NETWORK FUNCTION SERVICE PRODUCERS IN A HIERARCHICAL NETWORK

(71) Applicant: Oracle International Corporation, Redwood Shores, CA (US)

(72) Inventors: Amarnath Jayaramachar, Bangalore (IN); Sridhar Karuturi, Raleigh, NC (US); Yesh Goel, Bangalore (IN); Doki Satish Kumar Patro, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 279 days.

(21) Appl. No.: 17/689,777

(22) Filed: Mar. 8, 2022

(65) Prior Publication Data

US 2023/0292274 A1     Sep. 14, 2023

(51) Int. Cl.
*H04W 60/00* (2009.01)
*H04W 48/16* (2009.01)

(52) U.S. Cl.
CPC ........... *H04W 60/00* (2013.01); *H04W 48/16* (2013.01)

(58) Field of Classification Search
CPC ....... H04W 60/00; H04W 48/16; H04W 8/20; H04L 41/40; H04L 41/5058; H04L 67/51
See application file for complete search history.

(56) References Cited

U.S. PATENT DOCUMENTS 10,833,938 B1 * 11/2020 Rajput ................ H04L 67/1095
10,856,158 B2    12/2020 Mendoza et al.

(Continued)

FOREIGN PATENT DOCUMENTS

WO    WO 2023/229855 A1    11/2023

OTHER PUBLICATIONS

"3rd Generation Partnership Project; Technical Specification Group Core Network and Terminals; 5G System; Network Function Repository Services: Stage 3 (Release 16)", 3GPP TS 29.510, V16.10.0 (Dec. 2021).
Extended European Search Report for European Patent Application Serial No. 23157508.5 (Jul. 19, 2023).
Notice of Publication for European Patent Application Serial No. 23157508.5 (Aug. 17, 2023).

(Continued)

*Primary Examiner* — Mazda Sabouri
(74) *Attorney, Agent, or Firm* — Jenkins, Taylor & Hunt, P.A.

(57) ABSTRACT

Methods, systems, and computer readable media for discovering network function (NF) service producers in a hierarchical network are disclosed. One method includes receiving, by a regional NF repository function (NRF) operating in a first region of a hierarchical network, a NF registration request message from a NF service producer operating in the first region and detecting, by the regional NRF, an absence of <NF-Type>Info and/or <NF-Type>InfoList attribute data in the received NF registration request message. The method further includes creating, by the regional NRF, an entry in NrfInfo structure information directed toward a root NRF operating in the hierarchical network, wherein the entry includes an nfinstance identifier that identifies the NF service producer and is mapped to an empty structure field indicative of absent <NF-Type>Info and/or <NF-Type>InfoList attribute data and sending, by the regional NRF to the root NRF, the NrfInfo structure information via a registration message or update registration message.

20 Claims, 9 Drawing Sheets

(56) References Cited

U.S. PATENT DOCUMENTS

| | | |
|---|---|---|
| 11,477,670 B2 | 10/2022 | Mendoza et al. |
| 11,558,732 B1 | 1/2023 | Malhotra et al. |
| 11,743,363 B1 | 8/2023 | Goel |
| 2020/0296606 A1* | 9/2020 | Mendoza ............... H04L 41/12 |
| 2021/0064406 A1* | 3/2021 | Engelhart ........... G06F 9/45558 |
| 2021/0067480 A1* | 3/2021 | Goel .................. H04L 61/4511 |
| 2021/0067485 A1* | 3/2021 | Goel .................. H04L 61/4511 |
| 2021/0084508 A1 | 3/2021 | Mendoza et al. |
| 2021/0258861 A1* | 8/2021 | Wang ..................... H04W 48/14 |
| 2021/0367854 A1 | 11/2021 | Lee |
| 2021/0385732 A1 | 12/2021 | Reyes et al. |
| 2022/0191294 A1 | 6/2022 | Yang |
| 2022/0295384 A1* | 9/2022 | Gupta .................... H04W 8/12 |
| 2022/0295386 A1* | 9/2022 | Lu ........................... H04L 67/51 |
| 2022/0322270 A1* | 10/2022 | Srivastava .......... H04L 41/0226 |
| 2022/0346188 A1 | 10/2022 | Malhotra |
| 2022/0393971 A1 | 12/2022 | Rodrigo et al. |
| 2023/0007536 A1* | 1/2023 | Sharma ............... H04W 28/088 |
| 2023/0032054 A1* | 2/2023 | Jayaramachar ....... H04W 36/12 |
| 2023/0284292 A1* | 9/2023 | Hellgren ............. H04L 41/0895 370/329 |
| 2023/0413214 A1* | 12/2023 | Khare ..................... H04L 43/10 |
| 2024/0137290 A1* | 4/2024 | Alvarez Dominguez ................... H04L 41/40 |

OTHER PUBLICATIONS

Notice of Allowance and Fee(s) Due for U.S. Appl. No. 17/751,584, filed Jul. 14, 2023.

Applicant-Initiated Interview Summary for U.S. Appl. No. 17/751,584, filed Jul. 3, 2023.

Non-Final Office Action for U.S. Appl. No. 17/751,584, filed Mar. 29, 2023.

Commonly-Assigned, co-pending U.S. Appl. No. 17/751,584 for "Methods, Systems, and Computer Readable Media for Utilizing Network Function (NF) Service Attributes Associated with Registered NF Service Producers in a Hierarchical Network" (Unpublished, filed May 23, 2022).

"3rd Generation Partnership Project; Technical Specification Group Core Network and Terminals; 5G System; Network Function Repository Services; Stage 3 (Release 17)," 3GPP TS 29.510, V17.5.0, pp. 1-298 (Mar. 2022).

"3rd Generation Partnership Project; Technical Specification Group Core Network and Terminals; 5G System; Technical Realization of Service Based Architecture; Stage 3 (Release 17)," 3GPP TS 29.500, V17.6.0, pp. 1-126 (Mar. 2022).

"3rd Generation Partnership Project; Technical Specification Group Core Network and Terminals; 5G System; Network Function Repository Services; Stage 3 (Release 16)," 3GPP TS 29.510, V16.5.0, pp. 1-209 (Nov. 2020).

* cited by examiner

```
"nfInfo": {
"servedChfInfo": {
"5e23ebb0-c493-48ee-8df9-2c24579caaa2": {},
"bb41b1bb-7067-41b4-9807-fae6733b821f": {
    "supiRangeList": [
        {
            "start": "262720000000000",
            "end": "262729999999999"
        },
    ]
}
```

| NF Type | Include In NfInfo? | Remarks |
| --- | --- | --- |
| UDM | Yes | EMPTY structure is sent |
| AUSF | Yes | EMPTY structure is sent |
| PCF | Yes | EMPTY structure is sent |
| UDR | Yes | EMPTY structure is sent |
| BSF | Yes | EMPTY structure is sent |
| CHF | Yes | EMPTY structure is sent |
| AMF | NO | Has Mandatory sub-attr |
| UPF | NO | Has Mandatory sub-attr |
| SMF | NO | Has Mandatory sub-attr |

METHODS, SYSTEMS, AND COMPUTER READABLE MEDIA FOR DISCOVERING NETWORK FUNCTION SERVICE PRODUCERS IN A HIERARCHICAL NETWORK

TECHNICAL FIELD

The subject matter described herein relates to the registration and discovery of network function (NF) servicer producers in fifth generation (5G) communications networks. More particularly, the subject matter described herein relates to methods, systems, and computer readable media for discovering network function service producers in a hierarchical network.

BACKGROUND

In telecommunications networks, a service endpoint is an address on a network node that uniquely identifies an entity that provides service to service consumers. The service endpoint can include an Internet protocol (IP) address or a combination of IP address and transport layer port number, which is also referred to as an IP endpoint.

In fifth generation (5G) telecommunications networks, the network node that provides service is referred to as a network function (NF) service producer. A network node that consumes services is referred to as a NF service consumer. A network function can be both a NF service producer and a NF service consumer depending on whether it is consuming or providing service.

A given NF service producer may have many service endpoints. NF service producers register with a network function repository function (NRF). The NRF maintains a NF profile of available NF instances and their supported services.

Consumer NFs can subscribe to receive information about NF service producer instances that have registered with the NRF. Once registered, NF instances in the 5G network may establish sessions with one or more network exposure functions (NEFs). Notably, the NEF is a Third Generation Partnership Project (3GPP) network function that provides a means to securely expose the services and capabilities provided by producer network functions servicing the network.

In many instances, a 5G network may be segmented into multiple regions in accordance to a hierarchical deployment. In such a configuration, a root NRF must be designated and configured to communicate with a plurality of regional NRFs positioned in the various regions of the network (e.g., a public land mobile network (PLMN)). More specifically, each regional NRF is configured to register itself with the root NRF using the 'NrfInfo' attribute. As per 3GPP 29.510, if a NRF receives a Nnrf service request (e.g., such as subscription request, discovery request, or access-token request) and that NRF does not have the information needed to fulfil the request, then that NRF forwards the service request to a pre-configured NRF. In the hierarchical deployment, the root NRF is assigned as the pre-configured NRF. The root NRF is configured to process the forwarded Nnrf service request and identify the regional NRF that includes the NF service producers capable of servicing the request (e.g., referencing stored <NF-Type>Info and <NF-Type>InfoList attribute data and mapped nfinstance identifiers associated with NF service producers). The root NRF may then forward the request to the target regional NRF (and NF service producer) that can further process the service request.

However, there are many NF service producers that do not support <NF-Type>Info and <NF-Type>InfoList and hence do not include this information in the registration or registration update request (e.g., NFUpdate message) initially sent to the regional NRF. In such a scenario, the NF service producer's information is unable to include the data in the NrfInfo provided to the root NRF. Accordingly, such a NF service producer cannot be discovered for any Nnrf service operations by the root NRF and the NF consumers from other regions when operating within a hierarchical deployment. Such a deficiency can unnecessarily lead to a service outage scenarios.

Accordingly, there exists a need for improved methods and systems for discovering network function service producers in a hierarchical network.

SUMMARY

Methods, systems, and computer readable media for discovering network function (NF) service producers in a hierarchical network are disclosed. One method includes receiving, by a regional NF repository function (NRF) operating in a first region of a hierarchical network, a NF registration request message from a NF service producer operating in the first region and detecting, by the regional NRF, an absence of <NF-Type>Info and/or <NF-Type>Infolist attribute data in the received NF registration request message. The method further includes creating, by the regional NRF, an entry in NrfInfo structure information directed toward a root NRF operating in the hierarchical network, wherein the entry includes an nfinstance identifier that identifies the NF service producer and is mapped to an empty structure field indicative of absent <NF-Type>Info and/or <NF-Type>InfoList attribute data and sending, by the regional NRF to the root NRF, the NrfInfo structure information via a registration message or update registration message.

According to another aspect of the method described herein, the root NRF and the regional NRF are operating in separate regions of the hierarchical network.

According to another aspect of the method described herein, the root NRF stores the NrfInfo structure information in a local state information database.

According to another aspect of the method described herein, root NRF is configured to direct the service request message from a second regional NRF to the regional NRF using the NrfInfo structure information stored in the state information database.

According to another aspect of the method described herein, the service request message includes at least one of: a Nnrf subscription request message, a Nnrf discovery request message, or a Nnrf access token request message.

According to another aspect of the method described herein, the regional NRF utilizes a configuration table to determine if the NF service producer is permitted to be included in the NrfInfo structure information with the empty structure field indicative of absent <NF-Type>Info and/or <NF-Type>InfoList attribute data.

According to another aspect of the method described herein, the configuration table indicates one or more NF types that are prohibited from being added to the NrfInfo structure information with an empty structure field indicative of absent <NF-Type>Info and/or <NF-Type>InfoList attribute data.

According to another aspect of the disclosed subject matter described herein, one system for discovering network function service producers in a hierarchical network includes a root NRF that operates in a hierarchical network and includes a state information database configured to store NrfInfo information. The system further includes a regional NRF operating in a first region of the hierarchical network and configured to receive a NF registration request message from a NF service producer operating in the first region, detect an absence of <NF-Type>Info and/or <NF-Type>InfoList attribute data in the received NF registration request message, create an entry in NrfInfo structure information directed toward the root NRF, wherein the entry includes an nfinstance identifier that identifies the NF service producer and is mapped to an empty structure field indicative of absent <NF-Type>Info and/or <NF-Type>InfoList attribute data, and sending to the root NRF the NrfInfo structure information via a registration message or update registration message.

According to another aspect of the system described herein, the root NRF and the regional NRF are operating in separate regions of the hierarchical network.

According to another aspect of the system described herein, the root NRF stores the NrfInfo structure information in a local state information database.

According to another aspect of the system described herein, the root NRF is configured to direct the service request message from a second regional NRF to the regional NRF using the NrfInfo structure information stored in the state information database.

According to another aspect of the system described herein, the service request message includes at least one of: a Nnrf subscription request message, a Nnrf discovery request message, or a Nnrf access token request message.

According to another aspect of the system described herein, the regional NRF utilizes a configuration table to determine if the NF service producer is permitted to be included in the NrfInfo structure information with the empty structure field indicative of absent <NF-Type>Info and/or <NF-Type>InfoList attribute data.

According to another aspect of the system described herein, the configuration table indicates one or more NF types that are prohibited from being added to the NrfInfo structure information with an empty structure field indicative of absent <NF-Type>Info and/or <NF-Type>InfoList attribute data.

According to another aspect of the disclosed subject matter described herein, one or more non-transitory computer readable media having stored thereon executable instructions that when executed by at least one processor of a computer cause the computer to perform steps comprising: receiving, by a regional NRF operating in a first region of a hierarchical network, a NF registration request message from a NF service producer operating in the first region and detecting, by the regional NRF, an absence of <NF-Type>Info and/or <NF-Type>InfoList attribute data in the received NF registration request message. The steps performed further include creating, by the regional NRF, an entry in NrfInfo structure information directed toward a root NRF operating in the hierarchical network, wherein the entry includes an nfinstance identifier that identifies the NF service producer and is mapped to an empty structure field indicative of absent <NF-Type>Info and/or <NF-Type>InfoList attribute data and sending, by the regional NRF to the root NRF, the NrfInfo structure information via a registration message or update registration message.

According to another aspect of the one or more non-transitory computer readable media described herein, the root NRF and the regional NRF are operating in separate regions of the hierarchical network.

According to another aspect of the one or more non-transitory computer readable media described herein, the root NRF stores the NrfInfo structure information in a local state information database.

According to another aspect of the one or more non-transitory computer readable media described herein, root NRF is configured to direct the service request message from a second regional NRF to the regional NRF using the NrfInfo structure information stored in the state information database.

According to another aspect of the one or more non-transitory computer readable media described herein, the service request message includes at least one of: a Nnrf subscription request message, a Nnrf discovery request message, or a Nnrf access token request message.

According to another aspect of the one or more non-transitory computer readable media described herein, the regional NRF utilizes a configuration table to determine if the NF service producer is permitted to be included in the NrfInfo structure information with the empty structure field indicative of absent <NF-Type>Info and/or <NF-Type>InfoList attribute data.

According to another aspect of the one or more non-transitory computer readable media described herein, the configuration table indicates one or more NF types that are prohibited from being added to the NrfInfo structure information with an empty structure field indicative of absent <NF-Type>Info and/or <NF-Type>InfoList attribute data.

The subject matter described herein may be implemented in hardware, software, firmware, or any combination thereof. As such, the terms "function" "node" or "module" as used herein refer to hardware, which may also include software and/or firmware components, for implementing the feature being described. In one example implementation, the subject matter described herein may be implemented using one or more computer readable media having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for discovering network function service producers in a hierarchical network. In particular, the disclosed subject matter includes methods and systems that improve the visibility of NF service producers that operate in different regions of a hierarchical network and do not support <NF-Type>Info and/or <NF-Type>InfoList attribute data. As used herein, <NF-Type>Info and <NF-Type>InfoList can also be respectively represented as xxxinfo and xxxinfolist, where <NF-Type>Info or 'xxx' represents a specific NF-type per 3GPP TS 29.510 section 6.1.6.3.3. Reference will now be made in detail to various embodiments of the subject matter described herein, examples of which are illustrated in the accompanying drawings. Wherever possible, the same reference numbers will be used throughout the drawings to refer to the same or like parts.

Figure 1:
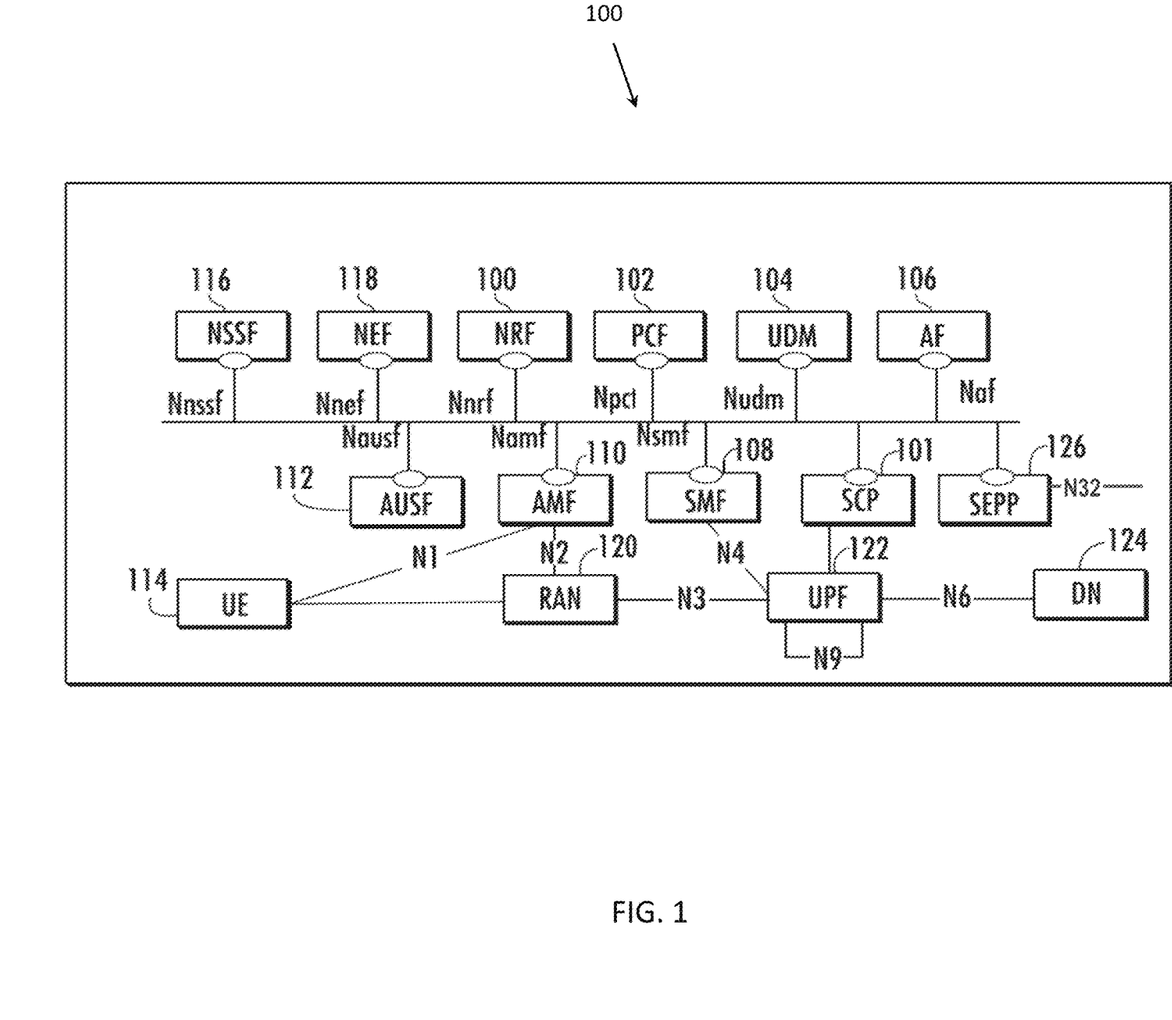
FIG. 1 is a network diagram illustrating an example fifth generation (5G) network architecture.

FIG. 1 is a block diagram illustrating an example 5G system network architecture, e.g., a home 5G core (5GC) network. The architecture in FIG. 1 includes an NRF 100 and an SCP 101, which may be located in the same home public land mobile network (PLMN). As described above, NRF 100 may maintain profiles of available NF service producer service instances and their supported services and allow consumer NFs or SCPs to subscribe to and be notified of the registration of new/updated NF service instances. SCP 101 may also support service discovery and selection of NF instances. SCP 101 may perform load balancing of connections between consumer and NF service producers. In addition, using the methodologies described herein, SCP 101 may perform preferred NF location based selection and routing.

NRF 100 is a repository for NF or service profiles of NF instances. In order to communicate with a NF instance, a consumer NF or an SCP must obtain the NF service profile or the NF instance from NRF 100. The NF or service profile is a JavaScript object notation (JSON) data structure defined in 3GPP Technical Specification (TS) 29.510. The NF or service profile definition includes at least one of a fully qualified domain name (FQDN), an Internet protocol (IP) version 4 (IPv4) address, or an IP version 6 (IPv6) address. In FIG. 1, any of the nodes (other than NRF 100) can be either consumer NFs or NF service producers, depending on whether they are requesting or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102.

AMF 110 performs mobility management operations similar to those performed by a mobility management entity (MME) in 4G networks. An authentication server function (AUSF) 112 performs authentication services for user devices, such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Security edge protection proxy (SEPP) 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. In some embodiments, the SEPP is an gateway device positioned on the edge of a network.

SEPP 126 may utilize an N32-c interface and an N32-f interface. An N32-c interface is a control plane interface between two SEPPs usable for performing an initial handshake (e.g., a TLS handshake) and negotiating various parameters for an N32-f interface connection and related message forwarding. An N32-f interface is a forwarding interface between two SEPPs usable for forwarding various communications (e.g., 5GC requests) between a consumer NF and a NF service producer after applying application level security protection.

Figure 2:
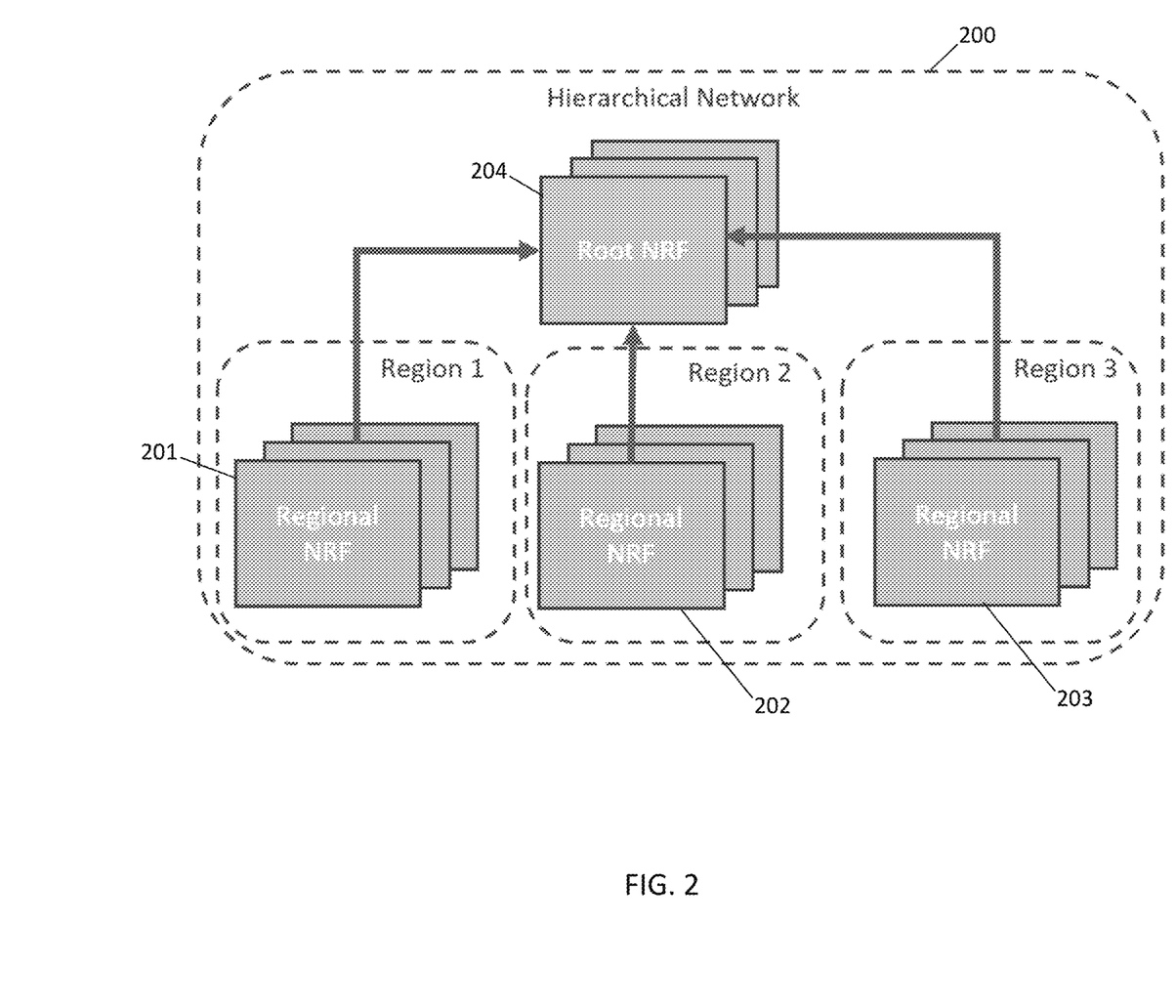
FIG. 2 is a block diagram illustrating a network including a plurality of network function repository functions (NRFs) operating in a hierarchical deployment.

As indicated above, the deployment of an NRF hierarchical system is required when two or more NRF segments are supported in a given network, such as a public land mobile network (PLMN). To illustrate, FIG. 2 depicts a hierarchical network 200 that includes a plurality of regional NRFs 201-103 and a root NRF 204. Notably, each of regional NRFs 201-203 is located in a separate network segments, or regions. Each regional NRF is configured to provide management, discovery, and access-token services to registered regional NFs (e.g., both NF service consumers and NF service producers). Regional NRFs 201-203 may also be configured to forward Nnrf service requests to root NRF 204 if a specific service request from an NF service consumer cannot be serviced by the regional NRF (and/or its registered NF service producers in the region) that originally receives the service request from the NF service consumer.

In some embodiments, root NRF 204 may be a part of and/or reside in any of network segment of hierarchical network 200. Root NRF 204 can also be deployed as a geo-redundant element for purposes of high-availability. Moreover, each of regional NRFs 201-203 and root NRF 204 is depicted in FIG. 2 as including redundant failover backups (e.g., three instances of each regional NRF in each region). Namely, the failover backups illustrated in FIG. 2 represent triple side redundancy measures employed by the operator(s) of hierarchical network 200.

In some embodiments, root NRF 204 is designated and configured to communicate with each the plurality of regional NRFs 201-203 positioned and/or operating in the various regions of a PLMN. More specifically, each of regional NRF 201-203 is configured to register itself with root NRF 204. Notably, the registration message and/or registration update message sent by a regional NRF to root NRF 204 contains 'NrfInfo attribute' information. As used herein, NrfInfo attribute refers to a minimal amount of data that describes a regional NRF, its registered NF service producers, and the services provided by the registered NF service producers. In some embodiments, the NrfInfo attribute information is an array that contains a listing of nfinstance identifiers (i.e., nfinstanceIDs) corresponding to various NF service producers registered with the regional NRF. Notably, the nfinstance identifiers in the NrfInfo attribute information serves as a key. Further, the NrfInfo attribute information contains a map of including <NF-Type>Info and/or <NF-Type>InfoList structure data for each registered NF service producer that supports info/ infolist data. In particular, the map includes a number of entries that correlate a nfinstanceID with the <NF-Type>Info and/or <NF-Type>InfoList structure data.

Figure 3:
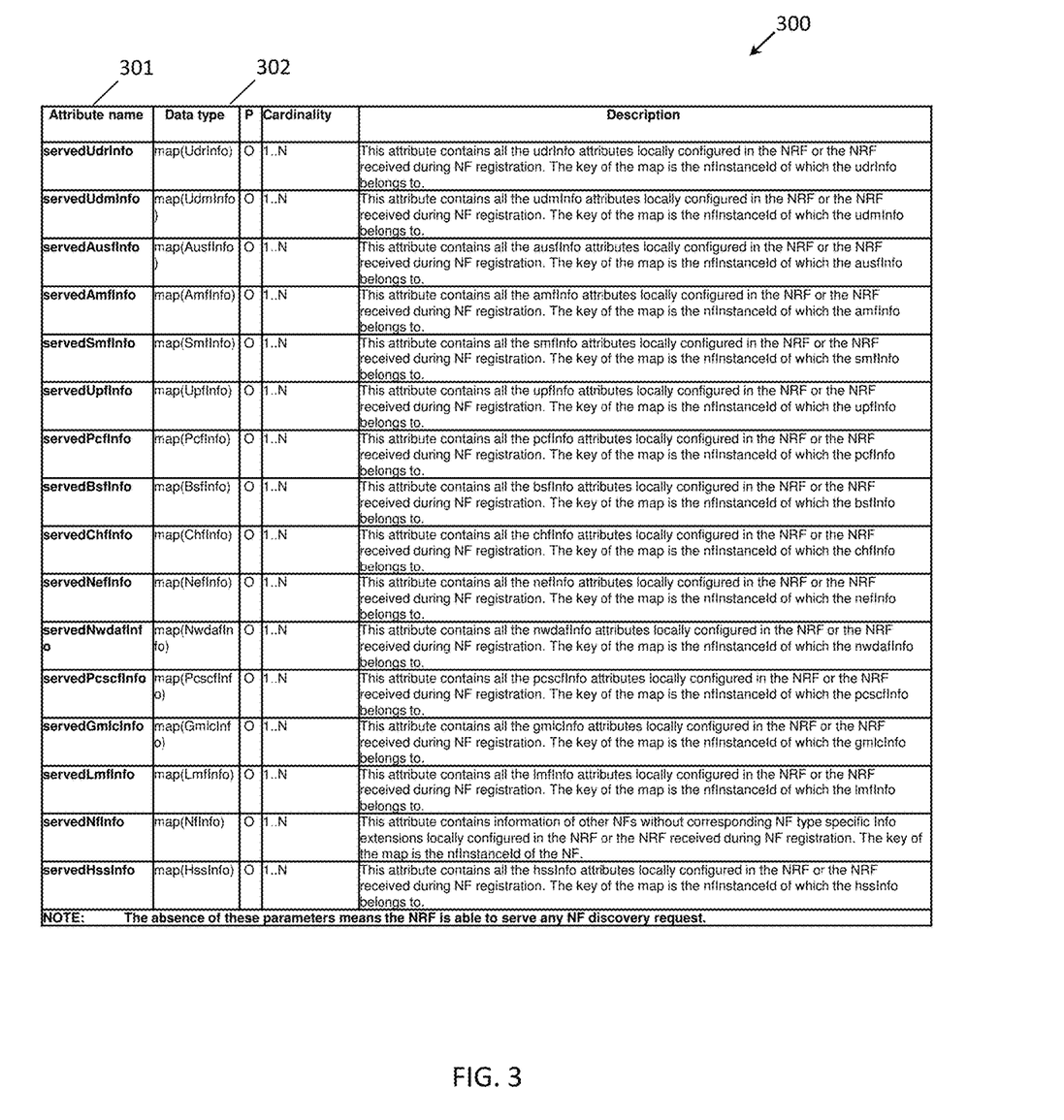
FIG. 3 is a signaling diagram illustrating a plurality of NRFs conducting intermediate forwarding of a service request message.

An exemplary NrfInfo attribute structure is depicted in a tabular format in FIG. 3. In particular, NrfInfo attribute 300 contains a plurality of <NF-Type>Info attributes listed in column 301 that includes the NF service types that are registered with the regional NRF. For example, column 301 of NrfInfo attribute 300 lists a number of registered UDR, UDM, AUSF, AMF, SMF, SUPF, PCF, DSF, CHF, NEF, NWDAF, PCSCF, GMLC, LMF, NF, and HSS instances as example NF service producer types included in the NrfInfo attribute that is provided by the regional NRF to the root NRF in registration requests and registration update requests while operating in hierarchical NRF deployments. Column 302 lists the corresponding <NF-Type>Info data that is respectively mapped to the attribute indicated in column 301.

As per the 3GPP TS 29.510 standard, if a regional NRF receives a Nnrf service request (e.g., such as a Nnrf subscription request, Nnrf discovery request, or Nnrf access-token request) and does not have the information (e.g., NF service producer identifier) needed to fulfil the request, then that regional NRF is configured to forward the service request to another pre-configured NRF. In a hierarchical deployment, the pre-configured NRF is designated as the root NRF (e.g., root NRF 204) for the network. Specifically, the root NRF is configured to process the received service request from the regional NRF in a first region and attempts to identify another regional NRF in a different region that includes registered NF service producers that can provide the requested service. More specifically, root NRF 204 may then forward the request to the target regional NRF which can further process the request.

Figure 4:
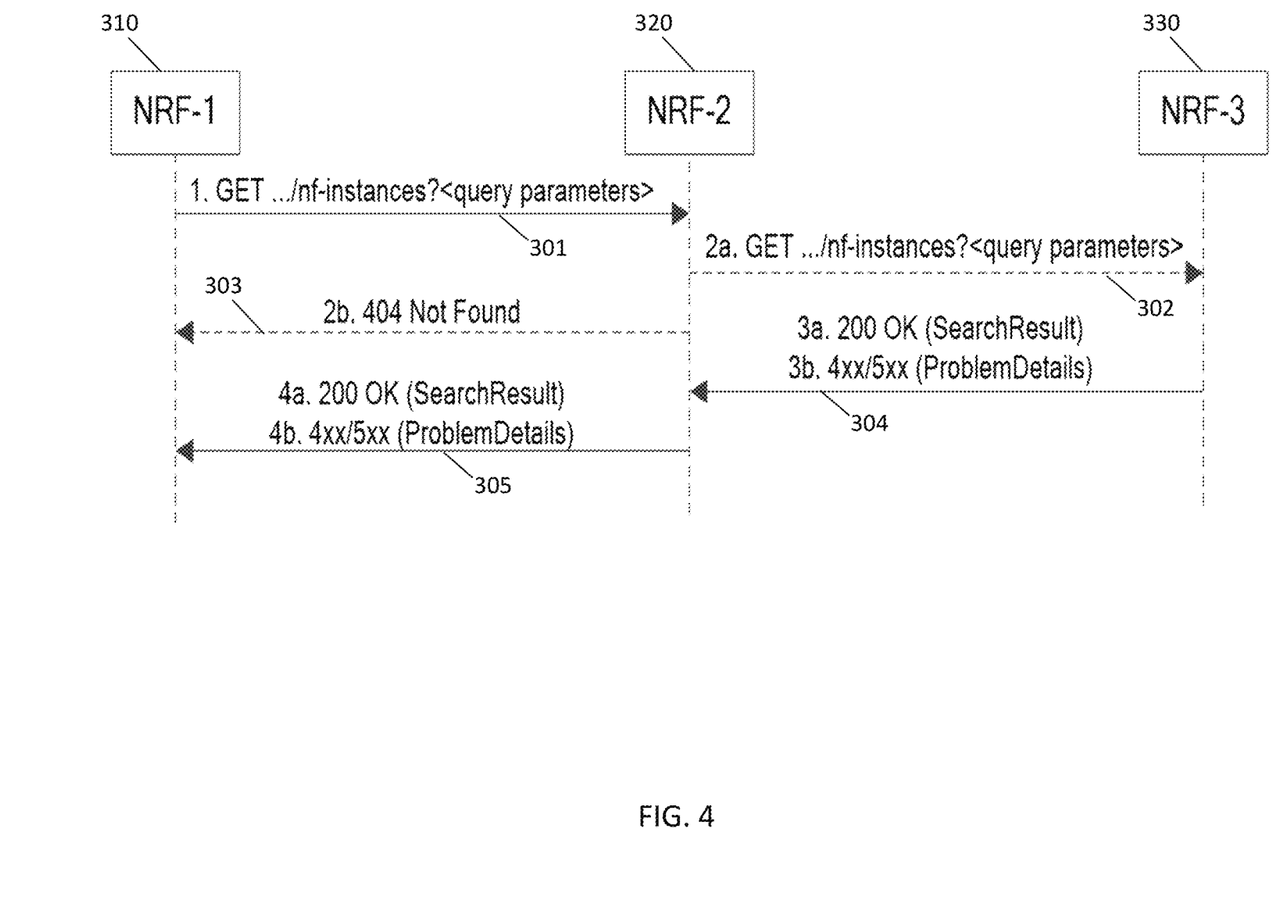
FIG. 4 is a block diagram illustrating a network including a plurality of NRFs receiving service requests while operating in a hierarchical deployment.

An example of this relaying of a service request message among different regional NRFs is called intermediate forwarding. For example, FIG. 4 depicts a signaling message flow diagram regarding an NF service discovery being conducted using an intermediate forwarding NRF. In FIG. 4, an example network includes NRFs 410, 420, and 430 that are communicatively connected to each other. NRF 410 may be configured to send a Nnrf service discovery message 401 to NRF 420 that requests NF instance identifiers for NF service producers that provide a particular service (that is not provided by an NF service producer registered with NRF 410). NRF 420 determines that it does not have any registered NF service producers that provide or support the requested service (e.g., as indicated by <query parameters>) and similarly sends message 402 (which may be forwarded message 401) to NRF 430. Moreover, NRF 420 is also configured to send a '404 Not Found' message 403 to NRF 410 indicating that NRF 420 does not include any registered NF service producers. After receiving service request message 402, NRF 430 is configured to determine (e.g., query its state information) if it includes a registered NF service producer that provides the requested service (i.e., indicated in message 402). If NRF 430 includes a registered NF service producer that provides the requested service, NRF 330 generates and sends a "200 OK" message 404 to NRF 320 (see message 3a). Upon receiving message 404, NRF 420 forwards message 405 to the original requesting NRF 410. Returning to NRF 430, if NRF 430 does not include a registered NF service producer that provides the requested service, then it generates and sends an error message (e.g., a 4xx/5xx (ProblemDetails) message 3b) to NRF 420 (see message 3b). After receiving this error message, NRF 420 forwards the same message (e.g., see message 4b) to original requesting NRF 410.

Figure 5:
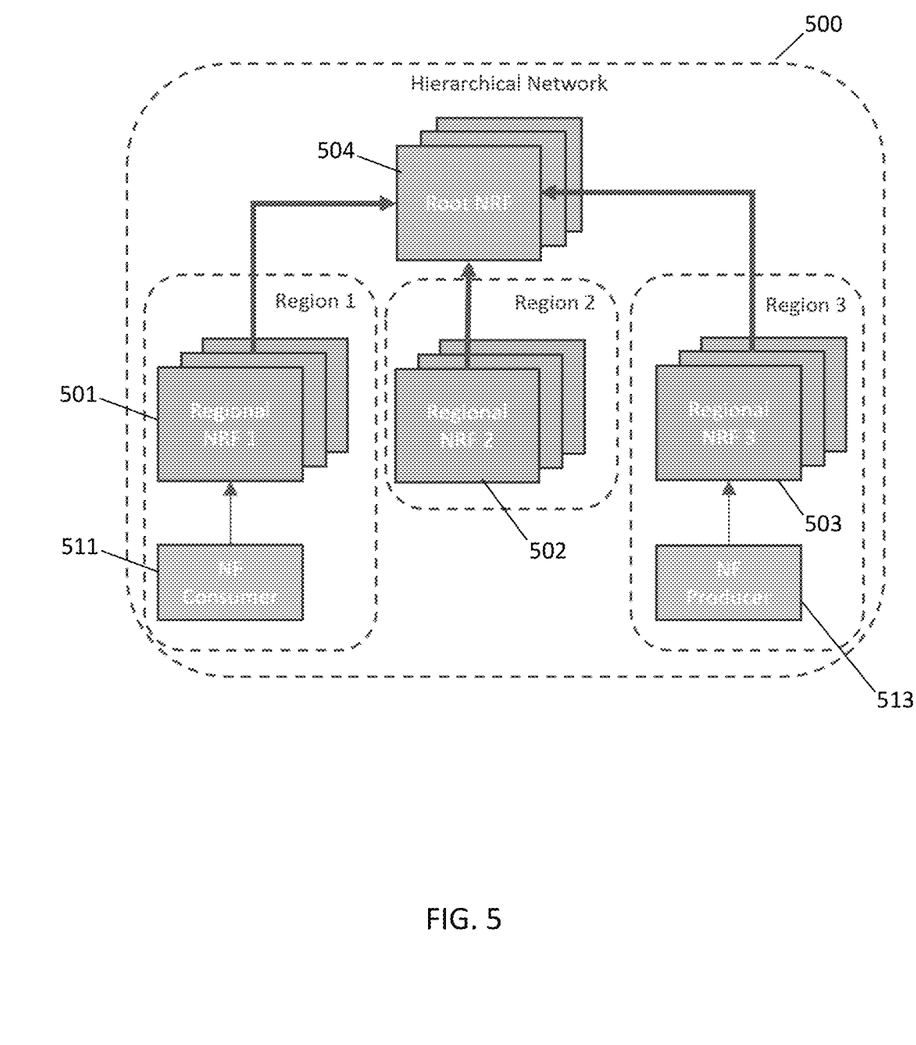
FIG. 5 is a flow diagram illustrating an exemplary method for processing response messages corresponding to the subsequent subscriber update request messages at an SEPP.

FIG. 5 depicts a block diagram of a hierarchical network 500 that includes NF service producers that do not provide and/or support <NF-Type>Info and <NF-Type>InfoList attributes. In some instances, NF service producers may not be configured to provide this optional attribute data (per 3GPP standards) because the NF service producers may be part of multi-vendor deployments, part of a previous product release that is yet configured to support the NFInfo attributes, or the like. Notably, <NF-Type>Info and <NF-Type>InfoList attributes may be optional attributes of the NFprofile provided by some NF service producers. In scenarios such as this, the NF service producer's information (i.e., <NF-Type>Info and <NF-Type>InfoList attribute information) is not propagated or provided to the root NRF. Consequently, NF service producers that do not provide their info/infolist information to regional NRFs cannot be discovered for any Nnrf service operation by any NF service consumers operating in other regions supported by other regional NRFs (since this information is not forwarded to the root NRF) in a hierarchical deployment. To illustrate an example scenario, consider NF service producer 513 registering with regional NRF 503 in region 3. Notably, NF service producer 513 registers with regional NRF 503 without including any <NF-Type>Info and <NF-Type>InfoList attribute information during registration. Consequently, when regional NRF 503 sends a registration request or update registration request containing its NrfInfo to root NRF 504, no information regarding NF service producer 513 will be included.

At some point in time after NF service producer 513 registers with regional NRF 503, NF service consumer 511 in region 1 sends a Nnrf discovery service request for a particular NF service producer to regional NRF 501. Since regional NRF 501 does not include a registration for the requested NF service producer (e.g., there are no NF service producers in region 1 matching the discovery criteria in the discovery service request), NRF 501 is configured to forward the Nnrf discovery service request to root NRF 504. After receiving the forwarded discovery request from NRF 501, root NRF 504 will not (and/or cannot) propagate the Nnrf discovery service request to regional NRF 503 because root NRF 504 has no knowledge (i.e., is unaware) of NF service producer 513 being registered to regional NRF 503. Notably, root NRF 504 never received NrfInfo containing the nfinstanceID and <NF-Type>Info and <NF-Type>InfoList attribute information associated with NF service producer 513 from regional NRF 503. As such, root NRF 504 will respond by sending an error response to regional NRF 501.

To remedy this lack of NF server producer visibility occurring at root NRF 504, the disclosed subject matter provides a solution wherein the root NRF is provided with NF server producer instance information despite the NF server producer not providing and/or supporting <NF-Type>Info and <NF-Type>InfoList attributes. One scenario depicting an exemplary solution can similarly be depicted using FIG. 5. For example, NF service producer 513 may initiate registration with regional NRF 503 in region 3. Notably, NF service producer 513 registers with regional NRF 503 without including the optional <NF-Type>Info and <NF-Type>InfoList attribute information during the registration process. After receiving the registration request from NF service producer 513 in which the <NF-Type>Info and <NF-Type>InfoList attributes are missing/absent, regional NRF 503 may be configured to include the nfinstance identifier (e.g., nfinstanceID) of NF service producer 513 along with an empty <NF-Type>Info and <NF-Type>InfoList attribute fields. More specifically, regional NRF 503 accepts the registration request message from NF service producer 513 absent the <NF-Type>Info and <NF-Type>InfoList attribute information. In response to detecting the absence of the <NF-Type>Info and <NF-Type>InfoList attribute information, regional NRF 503 is configured to construct <NF-Type>Info and <NF-Type>InfoList attribute information as an empty structure for inclusion in the NrfInfo to be sent to root NRF 504.

Figure 6:
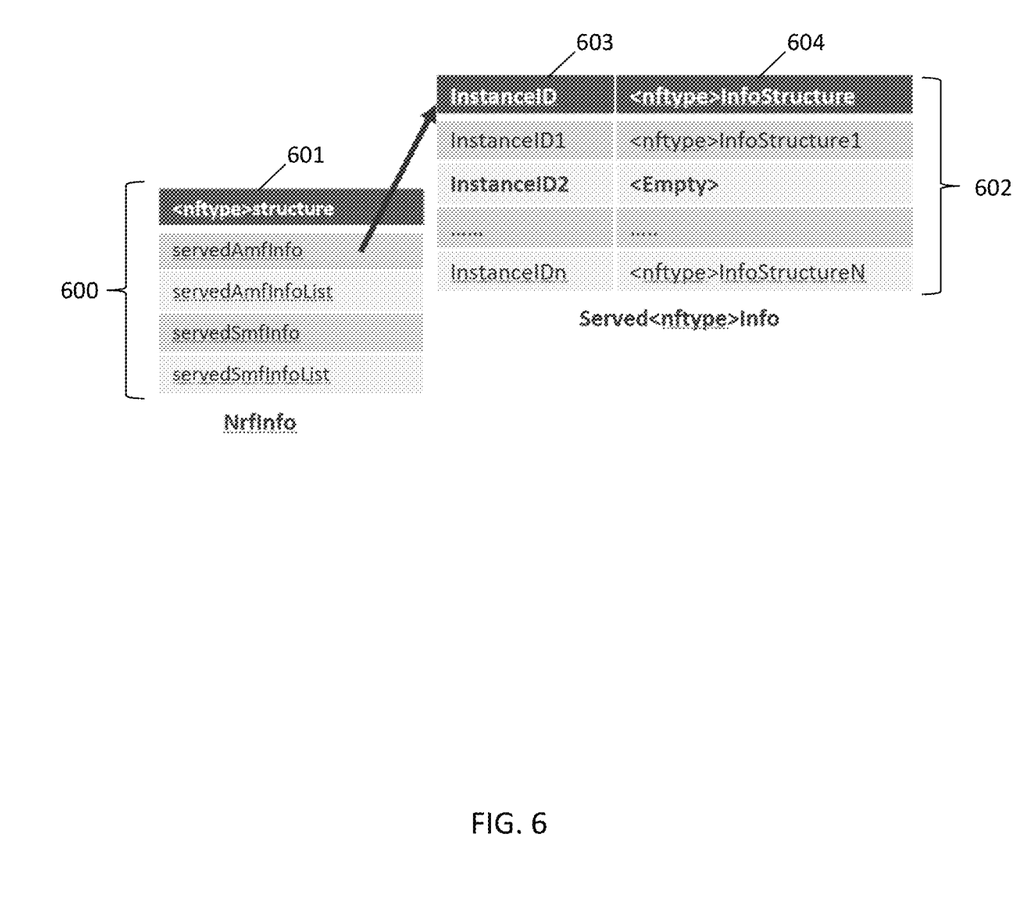
FIG. 6 is a diagram illustrating exemplary NrfInfo and <NF-Type>Info data structures.

An example of adding the empty structure is shown in FIG. 6, which depicts exemplary NrfInfo attribute entries. For example, column 601 of NrfInfo attribute 600 includes a plurality of NrfInfo attribute entries. Each of these entries includes 'Served<NF-Type>Info', as shown in data structure 602. To illustrate, the first entry in NrfInfo 600 is 'servedAmfInfo', which may include a number of different AMFs that are registered with a regional NRF in a specific region. For example, column 603 of data structure 602 lists a plurality of instance identifiers that correspond to a respective plurality of AMFs registered with the regional NRF. If the AMF supports <NF-Type>Info and <NF-Type>InfoList attributes, then the AMF's instanceID is added in column 603 and its corresponding InfoStructure information (i.e., <NF-Type>Info and/or <NF-Type>InfoList attribute data) is added in column 604 (e.g., <NF-Type>InfoStructure1 in column 604 is mapped to 'InstanceID1' identifying the AMF in column 603). In contrast, if the AMF does not support <NF-Type>Info and <NF-Type>InfoList attributes, then the regional NRF (to which the AMF is registered) is configured to generate a Served<NF-Type>Info entry. Instead of simply not adding any information to the Served<NF-Type>Info in the NrfInfo 600, the regional NRF will insert the instanceID of the NF service producer in column 603 (e.g., InsanceID2 is the NF service producer instance identifier). In addition, the regional NRF will construct and add an empty structure (e.g., <Empty>) as its corresponding InfoStructure information in column 604 (e.g., <Empty>entry in column 604 is mapped to 'InstanceID2' identifying the regional NRF in second entry of column 603).

Returning to FIG. 5, after regional NRF 503 constructs the <NF-Type>Info and <NF-Type>InfoList attribute information, the regional NRF inserts the attribute information as an entry into the NrfInfo. By doing this, a registration request and/or registration update request containing the NrfInfo is triggered and sent by regional NRF 503 to root NRF 504. An example NrfInfo schema containing a constructed empty structure is described below and illustrated in FIG. 7.

After the NrfInfo is provided to root NRF 504, root NRF 504 will have the regional NRF profile of regional NRF 503 and the nfinstanceIDs of all of the NF service producers registered with regional NRF 503.

Once root NRF 504 is provisioned with the above information, NF service consumer 511 in region 1 may send a Nnrf service request (e.g., discovery request) for a particular NF service producer to NRF 501. Since regional NRF 501 does not have a registration for the requested NF service producer and cannot serve the service request itself (e.g., there are no NF service producers in region 1 matching the discovery criteria in the discovery request from NF service consumer 511), regional NRF 501 is configured to forward the discovery request to root NRF 504. After receiving the forwarded discovery request from regional NRF 501, root NRF 504 is configured to access its local state information database that contains NrfInfo from the regional NRFs 501-503. In particular, root NRF 504 is configured to receive NrfInfo (which includes the NFInfo attribute for each NF service producer) included in registration request message and registration update request messages from each regional NRF in the hierarchical network. Moreover, root NRF 504 is configured to inspect the state information data to check for all the NrfInfo data using smart logic. Notably, the root NRF 504 is configured to utilize the stored NrfInfo data identify the specific regional NRFs where NF service producers capable of catering the service request are located. In some instances, the root NRF 504 may identify a multiple of NF service producers (e.g., regional NRFs 502 and 503). After root NRF 504 has identified/located all of the NF service producers that are capable of servicing the service request message, root NRF 504 is configured to process and sort the NF service producer identification data using operator-defined algorithms. For example, the sorting performed (e.g., sorting of identified NF service producers) by root NRF 504 may be based on attributes including NF types of the NF service producers. In some embodiments, considering/sorting NF service producers by NF-Type may be the default mode of operation. In other embodiments, root NRF 504 may also be configured with a local policy or extension that defines how to interpret NF service producers that do not have an info/infoList attribute. In addition to NF type, the local policy at the root NRF can consider priority scores assigned to the NF service producers, available capacity of the NF service producers, the locality of the NF service producers, and/or the like. Notably, based on the attributes mentioned above, root NRF 504 is configured to execute an algorithm defined by the policy/extension that identifies the NF service producers and generates an ordered list indicating the specific NF service producers (and their respective NRFs) to handle the service request message. After generating the list including ordered NF service producer information, root NRF 504 is able to forward the Nnrf service request to regional NRF 503 for further processing. Notably, root NRF 504 is able to identify NF service producers that do not support the info/infolist attribute that are operating in different regions in a hierarchical network deployment.

Figure 7:
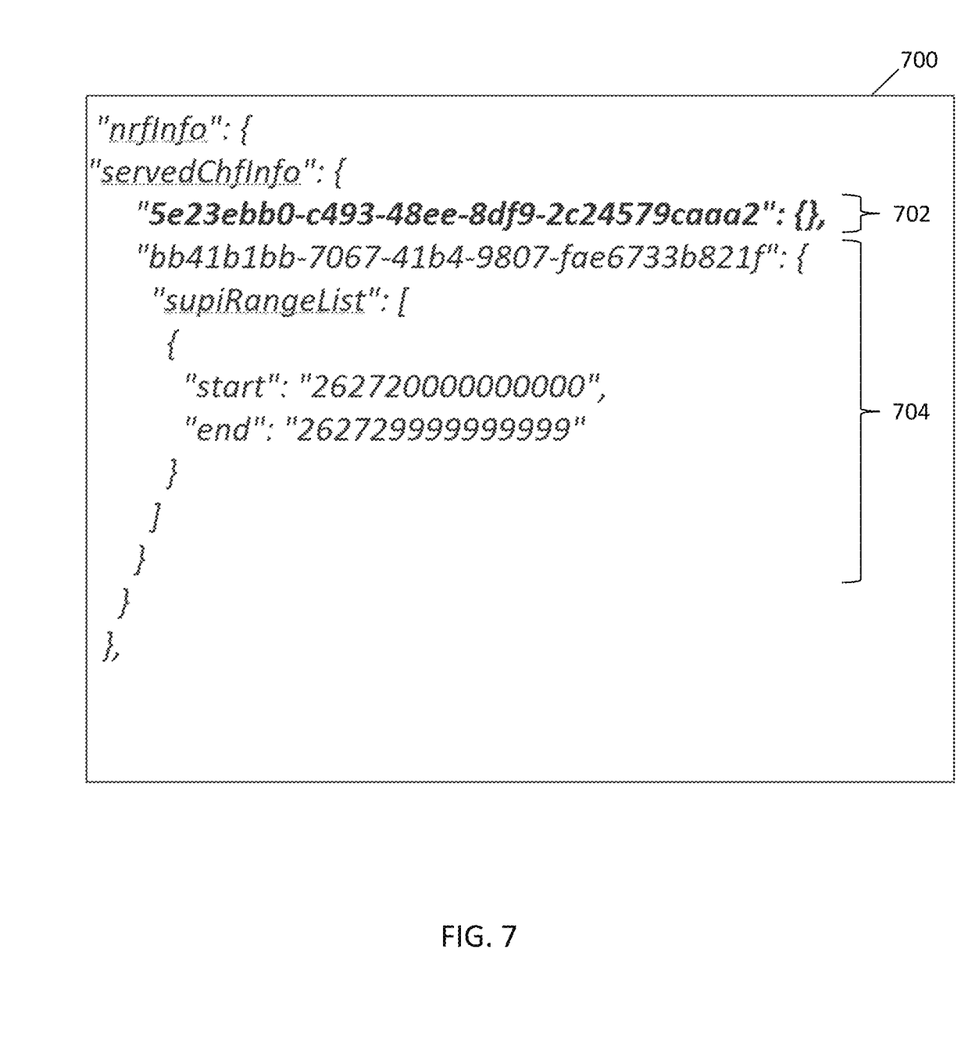
FIG. 7 is a diagram illustrating an schema of an NrfInfo attribute structure that is communicated to a root NRF.

FIG. 7 is a diagram illustrating an schema of an NrfInfo attribute structure that is communicated to a root NRF. In FIG. 7, NrfInfo structure 700 includes two ChfInfo instances. In particular, ChfInfo instance 702 includes the nfinstanceID (e.g., 5e23ebb0-c493 . . . ) for a first CHF instance operating in the local region. Notably, ChfInfo instance 702 has not provided the ChfInfo attribute to the regional NRF. As such, the regional NRF is configured to construct the ServedChfInfo attribute with an nfinstanceID and the empty structure data (e.g., see closed brackets at the end of instance 702). In some embodiments, the empty representation can also be configurable based on the root NRF support of empty attribute syntax.

In contrast, ChfInfo instance 704 (e.g., with nfinstanceID bb41b1bb-7067 . . . ) has provided the Chfinfo attribute for inclusion in the NrfInfo structure 700. Notably, Chfinfo instance 704 includes a defined SUPI range as part of the NFinfo corresponding to an NF service producer that does support <NF-Type>Info and <NF-Type>InfoList attributes.

Figure 8:
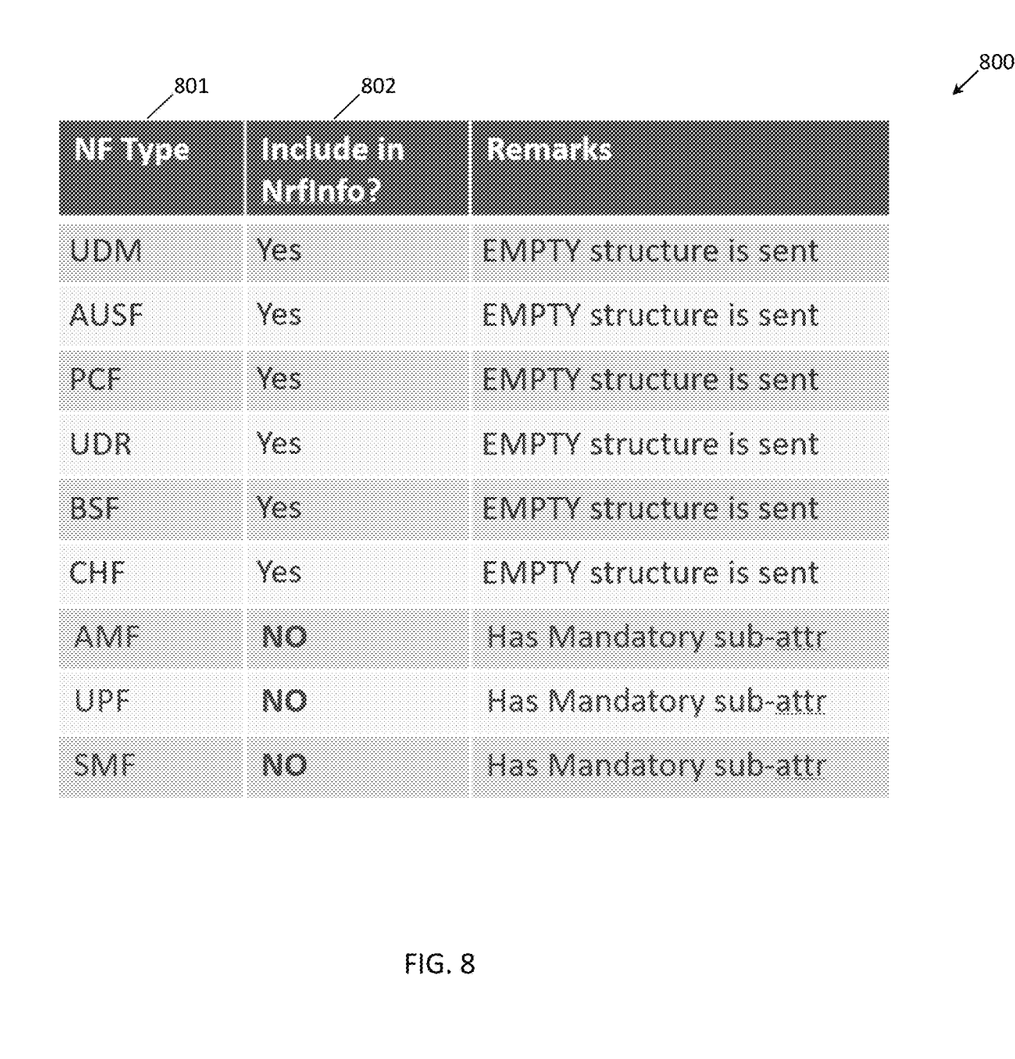
FIG. 8 is an exemplary configuration table that is utilized by a regional NRF.

FIG. 8 is an exemplary configuration table that is utilized by a regional NRF according to an embodiment of the subject matter described herein. In some embodiments, a regional NRF can utilize a configuration table 800 to determine which NF-Type can be included with the empty <NF-Type>Info and/or <NF-Type>InfoList attribute if missing in the NF service producer's NFprofie. In FIG. 8, column 801 lists a plurality of example NF Types that can be registered with a regional NRF. Likewise, column 802 of configuration table 800 indicates if the NF type is one that the regional NRF can include an empty <NF-Type>Info and/or <NF-Type>InfoList attribute in the NRF info should the regional NRF receive a NF registration request message from an NF service producer. For example, configuration table 800 indicates that the UDM, AUSF, PCF, UDR, BSF, and CHF are types of NF service producers in which the region NRF may include an empty structure for the <NF-Type>Info and/or <NF-Type>InfoList attribute fields in the NrfInfo attribute that will be sent to the root NRF via a registration request or registration update request. In contrast, column 801 of configuration table 800 indicates an AMF, UPF, and SMF as being NF types that have mandatory <NF-Type>Info and/or <NF-Type>InfoList attributes. As such, these NF service producers must provide their <NF-Type>Info and/or <NF-Type>InfoList attribute to the regional NRF for inclusion in the NrfInfo (i.e., an empty structure for info/infolist attribute cannot be constructed in the NrfInfo for these mandatory NF service producers).

Figure 9:
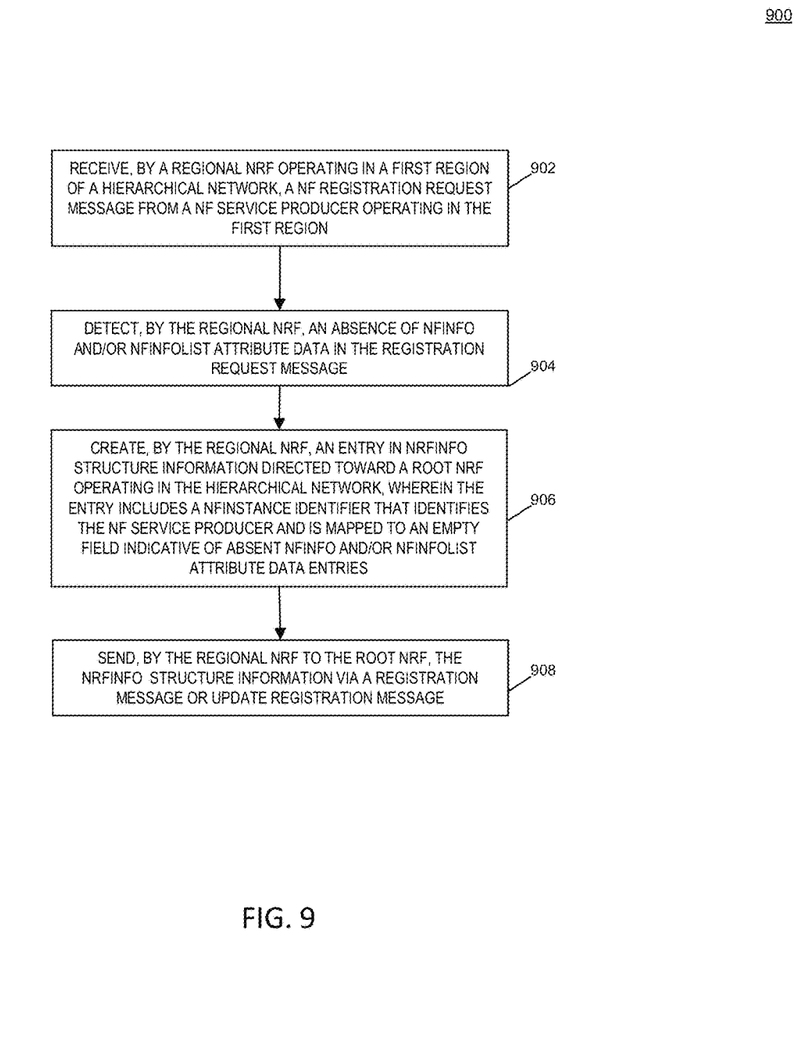
FIG. 9 is a flow diagram illustrating an exemplary method for discovering network function service producers in a hierarchical network.

FIG. 9 is a flow chart illustrating an example process for discovering network function service producers in a hierarchical network according to an embodiment of the subject matter described herein. In some embodiments, method 900 depicted in FIG. 9 is an algorithm, program, or script stored in memory that when executed by a processor performs the steps recited in blocks 902-908. In some embodiments, the method 900 represents a list of steps (or changes in steps) embodied in a state machine (e.g., either via software code programming or via a set of rules) and/or logic of the NRF and/or host computing device.

In block 902, the method includes receiving, by a regional NRF operating in a first region of a hierarchical network, a NF registration request message from a NF service producer operating in the first region. In some embodiments, a regional NRF receives an Nnrf registration request message from a NF service producer that seeks registration.

In block 904, the method includes detecting, by the regional NRF, an absence of <NF-Type>Info and/or <NF-Type>InfoList attribute data in the received NF registration request message. In some embodiments, the regional NRF inspects the received NF registration request message and determines that the message does not include <NF-Type>Info and/or <NF-Type>InfoList attribute data associated with the NF service producer.

In block 906, the method includes creating, by the regional NRF, an entry in NrfInfo structure information directed toward a root NRF operating in the hierarchical network. In some embodiments, the entry includes an nfinstance identifier that identifies the NF service producer and is mapped to an empty structure field indicative of absent <NF-Type>Info and/or <NF-Type>InfoList attribute data. The regional NRF is configured to send a registration message or an update registration message that includes NrfInfo corresponding to the NF service producers registered with the regional NRF. In some embodiments, the regional NRF is configures to insert an entry containing the nfinstanceID of the NF service producer and an empty structure for the <NF-Type>Info and/or <NF-Type>InfoList attribute fields.

In block 908, the method includes sending, by the regional NRF to the root NRF, the NrfInfo structure information via a registration message or update registration message. In some embodiments, the regional NRF sends a registration message (or update registration message) to the root NRF that contains NrfInfo that includes the nfinstanceID of the NF service producer (along with other NF service producers operating in the region) and empty <NF-Type>Info and/or <NF-Type>InfoList attribute fields.

It should be noted that the modified NRF and/or functionality described herein may constitute or be facilitated by a special purpose computing device. Further, the modified NRF and/or functionality described herein can improve the technological field of network visibility by assisting NF service producers to be discovered for Nnrf services from NF service consumers operating in a different region in a hierarchical network deployment. In particular, the ability to discover NF service producers in the manner described herein significantly reduces service outages and call failures.

The disclosure of each of the following references is incorporated herein by reference in its entirety.

REFERENCES 1. 3$^{rd}$ Generation Partnership Project; Technical Specification 5G; 5G System; Network function repository services; Stage 3 (Release 16) 3GPP TS 29.510 V16.5.0 (2020-11)
2. 3$^{rd}$ Generation Partnership Project; Technical Specification Group Services and System Aspects; Technical Realization of Service Based Architecture; Stage 3 (Release 16) 3GPP TS 29.500 V16.5.0 (2020-11)

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for discovering network function (NF) service producers in a hierarchical network, the method comprising:
   receiving, by a regional NF repository function (NRF) operating in a first region of a hierarchical network, a NF registration request message from a NF service producer operating in the first region;
   detecting, by the regional NRF, an absence of <NF-Type>Info and/or <NF-Type>InfoList attribute data in the NF registration request message;
   creating, by the regional NRF, an entry in NrfInfo structure information directed toward a root NRF operating in the hierarchical network, wherein the entry includes an nfinstance identifier that identifies the NF service producer and is mapped to an empty structure field indicative of absent <NF-Type>Info and/or <NF-Type>InfoList attribute data; and sending, by the regional NRF to the root NRF, the NrfInfo structure information via a registration message or an update registration message.

2. The method of claim 1 wherein the root NRF and the regional NRF are operating in separate regions of the hierarchical network.

3. The method of claim 1 wherein the root NRF stores the NrfInfo structure information in a local state information database.

4. The method of claim 3 wherein the root NRF is configured to direct a service request message from a second regional NRF to the regional NRF using the NrfInfo structure information stored in the local state information database.

5. The method of claim 4 wherein the service request message includes at least one of: a Nnrf subscription request message, a Nnrf discovery request message, or a Nnrf access token request message.

6. The method of claim 1 wherein the regional NRF utilizes a configuration table to determine if the NF service producer is permitted to be included in the NrfInfo structure information with the empty structure field indicative of absent <NF-Type>Info and/or <NF-Type>InfoList attribute data.

7. The method of claim 6 wherein the configuration table indicates one or more NF types that are prohibited from being added to the NrfInfo structure information with an empty structure field indicative of absent <NF-Type>Info and/or <NF-Type>InfoList attribute data.

8. A system for discovering network function (NF) service producers in a hierarchical network, the system comprising:

a root NF repository function (NRF) that operates in a hierarchical network and includes a state information database configured to store NrfInfo information; and a regional NRF operating in a first region of the hierarchical network and configured to receive a NF registration request message from a NF service producer operating in the first region, detect an absence of <NF-Type>Info and/or <NF-Type>InfoList attribute data in the NF registration request message, create an entry in NrfInfo structure information directed toward the root NRF, wherein the entry includes an nfinstance identifier that identifies the NF service producer and is mapped to an empty structure field indicative of absent <NF-Type>Info and/or <NF-Type>InfoList attribute data, and sending to the root NRF the NrfInfo structure information via a registration message or an update registration message.

9. The system of claim 8 wherein the root NRF and the regional NRF are operating in separate regions of the hierarchical network.

10. The system of claim 8 wherein the root NRF stores the NrfInfo structure information in a local state information database.

11. The system of claim 10 wherein the root NRF is configured to direct a service request message from a second regional NRF to the regional NRF using the NrfInfo structure information stored in the local state information database.

12. The system of claim 11 wherein the service request message includes at least one of: a Nnrf subscription request message, a Nnrf discovery request message, or a Nnrf access token request message.

13. The system of claim 8 wherein the regional NRF utilizes a configuration table to determine if the NF service producer is permitted to be included in the NrfInfo structure information with the empty structure field indicative of absent <NF-Type>Info and/or <NF-Type>InfoList attribute data.

14. The system of claim 13 wherein the configuration table indicates one or more NF types that are prohibited from being added to the NrfInfo structure information with an empty structure field indicative of absent <NF-Type>Info and/or <NF-Type>InfoList attribute data.

15. One or more non-transitory computer readable media having stored thereon executable instructions that when executed by at least one processor of a computer cause the computer to perform steps comprising:

receiving, by a regional network function repository function (NRF) operating in a first region of a hierarchical network, a network function (NF) registration request message from a NF service producer operating in the first region;

detecting, by the regional NRF, an absence of <NF-Type>Info and/or <NF-Type>InfoList attribute data in the NF registration request message;

creating, by the regional NRF, an entry in NrfInfo structure information directed toward a root NRF operating in the hierarchical network, wherein the entry includes an nfinstance identifier that identifies the NF service producer and is mapped to an empty structure field indicative of absent <NF-Type>Info and/or <NF-Type>InfoList attribute data; and sending, by the regional NRF to the root NRF, the NrfInfo structure information via a registration message or an update registration message.

16. The one or more non-transitory computer readable media of claim 15 wherein the root NRF and the regional NRF are operating in separate regions of the hierarchical network.

17. The one or more non-transitory computer readable media of claim 15 wherein the root NRF stores the NrfInfo structure information in a local state information database.

18. The one or more non-transitory computer readable media of claim 17 wherein the root NRF is configured to direct a service request message from a second regional NRF to the regional NRF using the NrfInfo structure information stored in the local state information database.

19. The one or more non-transitory computer readable media of claim 18 wherein the service request message includes at least one of: a Nnrf subscription request message, a Nnrf discovery request message, or a Nnrf access token request message.

20. The one or more non-transitory computer readable media of claim 15 wherein the regional NRF utilizes a configuration table to determine if the NF service producer is permitted to be included in the NrfInfo structure information with the empty structure field indicative of absent <NF-Type>Info and/or <NF-Type>InfoList attribute data.

* * * * *